Oct. 26, 1965 H. P. STICKEL ET AL 3,214,163

RECORD READER

Original Filed June 20, 1961 14 Sheets-Sheet 1

Inventors
Herbert P. Stickel
Harry R. Kattelmann

BY

Strauch, Nolan & Neale
ATTORNEYS

Oct. 26, 1965 H. P. STICKEL ET AL 3,214,163

RECORD READER

Original Filed June 20, 1961 14 Sheets-Sheet 2

Inventors
Herbert P. Stickel
Harry R. Kattelmann

BY

Strauch, Nolan + Neale

ATTORNEYS

Oct. 26, 1965 H. P. STICKEL ET AL 3,214,163

RECORD READER

Original Filed June 20, 1961 14 Sheets-Sheet 3

Inventors
Herbert P. Stickel
Harry R. Kattelmann

BY

ATTORNEYS

Oct. 26, 1965 H. P. STICKEL ET AL 3,214,163

RECORD READER

Original Filed June 20, 1961 14 Sheets-Sheet 4

Inventors
Herbert P. Stickel
Harry R. Kattelmann

BY

Strauch, Nolan + Neale
ATTORNEYS

Oct. 26, 1965 H. P. STICKEL ET AL 3,214,163

RECORD READER

Original Filed June 20, 1961 14 Sheets-Sheet 5

Inventors
Herbert P. Stickel
Harry R. Kattelmann

BY

Strauch, Nolan + Neale
ATTORNEYS

RECORD READER

Original Filed June 20, 1961 14 Sheets-Sheet 6

Inventors
Herbert P. Stickel
Harry R. Kattelmann

BY

Strauch, Nolan + Neale
ATTORNEYS

RECORD READER

Original Filed June 20, 1961

Inventors
Herbert P. Stickel
Harry R. Kattelmann

BY Strauch, Nolan + Neale
ATTORNEYS

RECORD READER

Original Filed June 20, 1961

Inventors
Herbert P. Stickel
Harry R. Kattelmann

BY Strauch, Nolan + Neale
ATTORNEYS

Oct. 26, 1965 H. P. STICKEL ET AL 3,214,163

RECORD READER

Original Filed June 20, 1961 14 Sheets-Sheet 9

Inventors
Herbert P. Stickel
Harry R. Kattelmann

BY

Strauch, Nolan + Neale
ATTORNEYS

RECORD READER

Original Filed June 20, 1961

Inventors
Herbert P. Stickel
Harry R. Kattelmann

BY

Strauch, Nolan + Neale
ATTORNEYS

Oct. 26, 1965 H. P. STICKEL ET AL 3,214,163

RECORD READER

Original Filed June 20, 1961 14 Sheets-Sheet 11

Inventors
Herbert P. Stickel
Harry R. Kattelmann

BY

Strauch, Nolan + Neale
ATTORNEYS

Inventors
Herbert P. Stickel
Harry R. Kattelmann

BY

Strauch, Nolan & Neale
ATTORNEYS

Oct. 26, 1965 H. P. STICKEL ET AL 3,214,163

RECORD READER

Original Filed June 20, 1961 14 Sheets-Sheet 13

Inventors
Herbert P Stickel
Harry R. Kattelmann

BY

Strauch, Nolan + Neale

ATTORNEYS

Oct. 26, 1965 H. P. STICKEL ET AL 3,214,163

RECORD READER

Original Filed June 20, 1961 14 Sheets-Sheet 14

Inventors
Herbert P. Stickel
Harry R. Kattelmann

BY

Strauch, Nolan + Neale
ATTORNEYS

United States Patent Office 3,214,163
Patented Oct. 26, 1965

3,214,163
RECORD READER

Herbert P. Stickel, Orinda, and Harry R. Kattelmann, Oakland, Calif., assignors to SCM Corporation, a corporation of New York Original application June 20, 1961, Ser. No. 118,284. Divided and this application Nov. 8, 1962, Ser. No. 243,173
5 Claims. (Cl. 271—8)

This is a division of application Serial. No. 118,284, filed June 20, 1961, now Patent No. 3,141,958.

The present invention relates to record reading devices and more particularly to perforated record readers which are adapted to read perforated records of various types and having varying codes. The present invention in its illustrated embodiment provides a perforated record reader adapted for use as a data input device in a data processing system which is capable of reading either perforated tape records or edge punched card records and utilizing any of the usual five, six, seven or eight channel codes.

The fundamental overall object of this invention is to provide an easily manipulatable record reader unit which is adapted to accommodate a variety of records and codes.

More specifically, it is an object of this invention to provide a relatively inexpensive highly flexible record reader of the type to which successive records are manually supplied, which may be utilized as a data input device for a wide variety of data processing machines, and which is operable to read records of a variety of forms and codes.

In furtherance of the foregoing, general objects of this invention, the specific further objects of this invention are to provide a record reader to which successive records are supplied manually which:

(a) Is adapted for alternative manual or power record feed, (b) Is adapted for alternative manual or power record feed in which the type of record feed is readily selectable by the operator, (c) embodies a power actuated record feed which precludes improper record feed in response to an actuating signal of abnormally long duration, (d) embodies a power actuated impulse controlled record feed which is operative to advance a record a single step in response to each actuating impulse having a predetermined minimum duration irrespective of the duration of any of such impulses beyond said predetermined minimum duration, (e) embodies as a record sensing device a light source and a plurality of photo responsive elements disposed on opposite sides of the path of record movement and a selectively positionable reflector for alternatively directing light emanating from such source toward or away from such photo responsive elements, (f) embodies a record retaining guide structure which is effective to retain the leading edge of a record prior to its driving engagement with the record feed mechanism and its trailing edge subsequent to such engagement to thereby prevent such a record from dropping from the reader, (g) embodies a power actuated record feed which is effective to render such a record feed inoperable under power in the absence of a record in engagement with the record feed, (h) is operable without modification to alternatively read either unit records or continuous records; and (i) is manually adjustable to accommodate records on which data has been recorded in codes of varying numbers of channels.

These and other objects of this invention will become more fully apparent by reference to the appended claims and as the following detailed description proceeds in reference to the accompanying drawings wherein:

FIGURE 9 is a perspective view of the record feed selection mechanism;

*General description*

Figures 1, 2, 3:
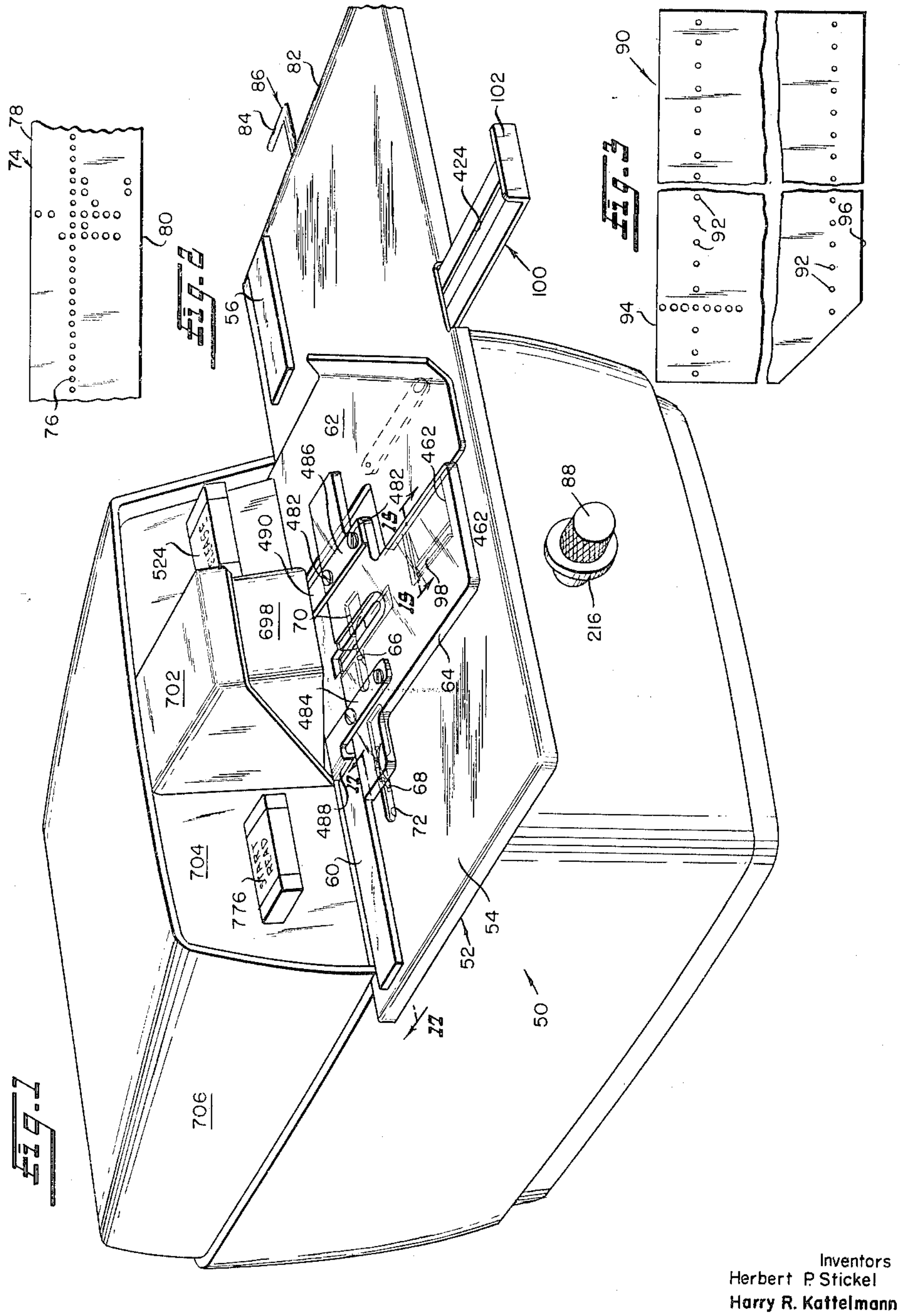
FIGURE 1 is a perspective view of the record reader of the present invention.
FIGURE 2 is a fragmentary plan view of a perforated tape record readable in the reader of FIGURE 1.
FIGURE 3 is a plan view of an edge punched card record readable in the reader of FIGURE 1.
Figure 17:
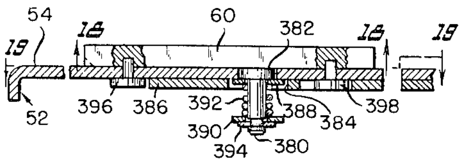
FIGURE 17 is a fragmentary section view of one of the record edge guides taken substantially along the line 17—17 of FIGURE 1.

Referring now to FIGURE 1, the record reader 50 of the present invention embodies a record support table 52 having a planar top surface 54, a plurality of aligned record edge guides 56 and 60, a fixed metallic record hold-down plate 62, a pivoted transparent plastic hold-down plate 64, and a pair of peripherally toothed longitudinally spaced and transversely aligned record feed sprockets 66 and 68 projecting through elongated apertures 70 and 72 respectively in the table 52 beneath hold-down plate 64. A typical perforated record tape 74 which may be read in the reader 50 is shown in FIGURE 2. Tape 74 conventionally has a longitudinally extending row of feed holes 76 which are longitudinally spaced center to center a distance equal to the center to center circumferential spacing of the adjacent teeth of sprockets 66 and 68. Tape 74 is perforated with transverse rows of code holes, the combination of holes in each transverse row being an indication, in code, of a character, numeral or function. The present reader is adapted to accommodate tapes or cards having five, six, seven or eight channels. In accord with conventional practice, the transverse center to center spacing between the code holes of the channels is constant and the spacing of the feed holes from the code holes of the most closely adjacent channels is constant regardless of the number of channels, the overall width of the tape being variable, an 11/16" wide tape being used for five channels, a 7/8" tape for six or seven chanels, and a 1" tape for six, seven or eight channels in commercial practice. In five channel tapes, there are two code hole positions or channels between the row of feed holes 76 and the edge 78 of the tape 74 whereas in six, seven or eight channel tapes there are three. In five channel tapes there are three code holes or channels between the row of feed holes 76 and the edge 80 of the tape 74; in six channel tapes, there are three; in seven channel tapes, there are four; and in eight channel tapes, there are five.

In order to read a tape such as 74, the pivoted hold-down plate 64 is lifted as will be explained presently, the end of the tape 74 fed between the edge 82 of the table 52 and the parallel arm 84 of the tape guide 86, along the top surface 54 of table 52 with its edge 78 in engagement with the edge guides 56 and 60, over the fixed hold-down plate 62 to a position over the apertures 70 where the feed holes 76 thereof are engaged with the teeth of the sprocket 66. As will be explained presently, guides 56 and 60 each have two positions laterally of the direction of record movement, a forward position for five channel tapes and a rearward position for six, seven or eight channel tapes. The pivoted hold-down plate 64 is then returned to the position shown in FIGURE 1 to retain the tape 74 in driving engagement with the sprockets 66 and 68. When so positioned the tape 74 can be advanced in steps longitudinally in either direction manually by manipulation of a hand knob 88 or power fed in steps in its normal forward direction, to the left as viewed in FIGURE 1, as will be explained in detail presently.

A typical edge punched card 90 is illustrated in FIGURE 3. Card 90 has a longitudinal row of card feed holes 92 punched therethrough adjacent each of its longitudinal edges 94 and 96. The spacing of the feed holes 92 from the edges 94 and 96 is the same for the various numbers of channels as the spacing between holes 76 and edge 78 of the tape 74 shown in FIGURE 2 as described above. The code holes are arranged in transverse rows along each edge of the card 90 in the same relation to feed holes 92 as described above in reference to the tape 74 for five, six, seven or eight channels. As is apparent, the lateral spacing between the edges 94 and 96 of card 90 is of no significance in reading the edge perforations. To read card 90 in the reader 50 (FIGURE 1), the plate 64 is lifted, the card 90 inserted between the top surface 54 of table 52 and the fixed plate 62, either its edge 94 or its edge 96 placed against the guide 56 and advanced to the left as viewed in FIGURE 1 until its leading edge engages a pivoted card positioning stop 98. The structure and operation of stop 98 will be explained presently. At this point it will suffice to understand that when hold-down plate 64 is raised, stop 98 rises into the path of a card fed along table 52 and is lowered below the surface 54 of table 52 when plate 64 is restored to its position as shown in FIGURE 1.

With the leading edge of card 90 in engagement with stop 98, the first of its feed holes 92 is positioned in alignment with the uppermost tooth of sprocket 66 and its first row of code holes positioned for reading as will be explained shortly. With the card 90 so positioned, a movable guide 100 is positioned with its upturned guide edge in engagement with the adjacent edge 94 or 96 of card 90 if not already so positioned, the plate 64 is restored to its FIGURE 1 position and the card 90 is ready for step by step advance to the left as viewed in FIGURE 1 manually or by power actuation in the same manner as a tape 74. By this arrangement, cards can be inserted in the machine and the machine started by the operator using but one hand.

Figure 4:
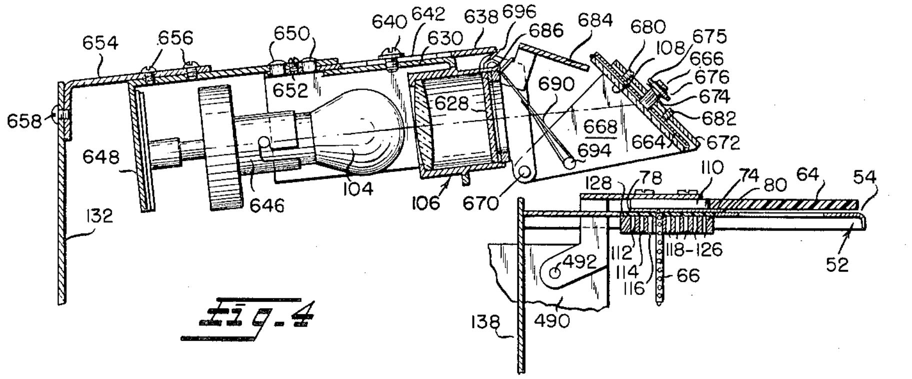
FIGURE 4 is a fragmentary longitudinal sectional view illustrating the record reader optical system.

As the card 90 is so advanced, its successive rows of code holes will be read. When a perforated record card 90 or tape 74 is positioned as described above in engagement with sprockets 66 and 68, it intercepts a downwardly directed beam of light. If the record is perforated in any code position, light from the beam will pass through the record and impinge upon a photovoltaic cell disposed immediately below that code position. This optical system is best illustrated in FIGURE 4. As is therein shown, light emanating from a suitable source such as incandescent lamp 104, is directed by a suitable lens system 106 upon a mirror 108 by which it is reflected downwardly through an aperture 110 in transparent hold-down plate 64 upon the top surface of the perforated record such as tape 74. A row of eight photovoltaic cells 112–126 extending transversely of the direction of record feed is mounted beneath the level of table 52 in alignment with a plane including the axis of the sprocket 66 and lying perpendicular to the plane of surface 54 of table 52. The number of photovoltaic cells 112–126 is equal in number to the maximum number of channels in the records upon which the machine is designed to operate, in this embodiment, eight. Immediately above photovoltaic cells 112–126, a transparent insert window 128 is provided in a correspondingly shaped opening in table 52. Whenever there is a hole in the record above one of the photovoltaic cells 112–126, that photovoltaic cell will be irradiated and activate an individually associated control circuit to be described hereinafter to produce an electrical signal. The combination of electrical signals produced by the activation or lack of activation of the individual control circuits associated with photovoltaic cells 112–126 will provide an electrical data indicative signal corresponding to the code pattern being sensed by the record. Each electrical data indicative signal will be maintained so long as the record remains stationary and will change to the next signal when the record is advanced.

With the foregoing general features in view, this description will now proceed in detail as to the various aspects of this reader.

*Base construction*

Figure 5:
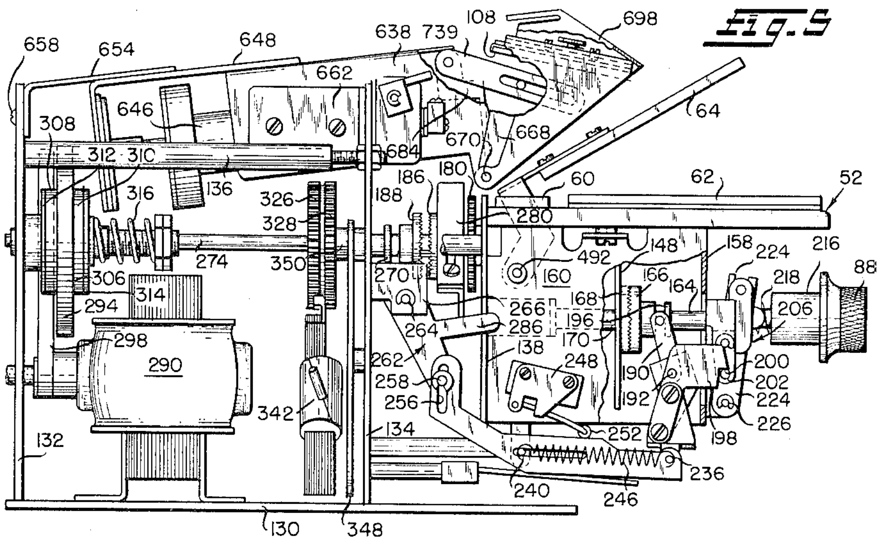
FIGURE 5 is a left side elevational view, partially broken away, of the reader of FIGURE 1 with its cover removed and showing the pivoted record hold-down plate in its elevated position and the manual record feed engaged.
Figure 7:
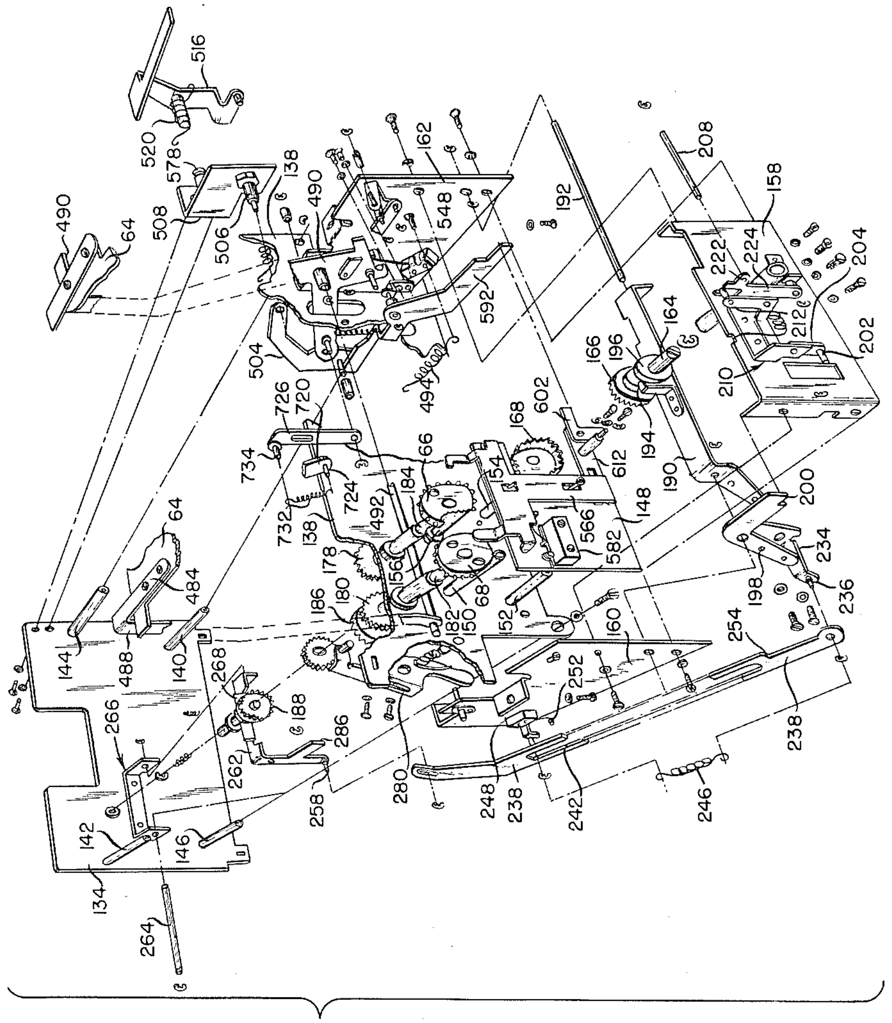
FIGURE 7 is an exploded perspective view of the record feed mechanisms.

The reader 50, within its external casing as shown in FIGURE 1, is provided with a base or frame structure best shown in FIGURES 5 and 7. This base structure comprises a base plate 130 (FIGURE 5), a rear vertical support plate 132 fixed to plate 130, an intermediate support plate 134 fixed to plate 130 and rigidly interconnected to plate 132 by a tie rod 136, a support plate 138 (FIGURE 7) fixed to plate 134 by support studs 140, 142, 144 and 146, a plate 148 fixed to plate 138 by studs 150, 152, 154 and 156, and a plate 158 fixed to plate 138 by side support plates 160 and 162. Plates 132, 134, 138, 148 and 158 are parallel and normal to base plate 130. Side plates 160 and 162 are parallel and normal to base plate 130 and to support plates 138 and 158. The record support table 52 is fixed to and supported by plates 138, 160 and 162 as is best shown in FIGURE 5.

*Record feed—Manual*

As is apparent from a comparison of FIGURES 5 and 6, manual record feed knob 88 has two axial positions, a depressed position shown in FIGURE 5 in which rotary manipulation of knob 88 will impart rotation to feed sprockets 66 and 68 (FIGURE 1) as will be explained and a released position shown in FIGURE 6 in which knob 88 is disengaged from sprockets 66 and 68.

Knob 88 is fixed to a shaft 164 which is journalled on plate 158 and has a jaw clutch element 166 fixed to its opposite end. When knob 88 is depressed as shown in FIGURE 5, shaft 164 and clutch element 166 are axially shifted toward the rear of the reader 50 (to the left as viewed in FIGURE 5) to engage clutch element 166 with a complementary axially fixed clutch element 168 fixed upon the end of a shaft 170 journalled upon plates 138 and 148 in co-axial alignment with shaft 164.

Figure 8:
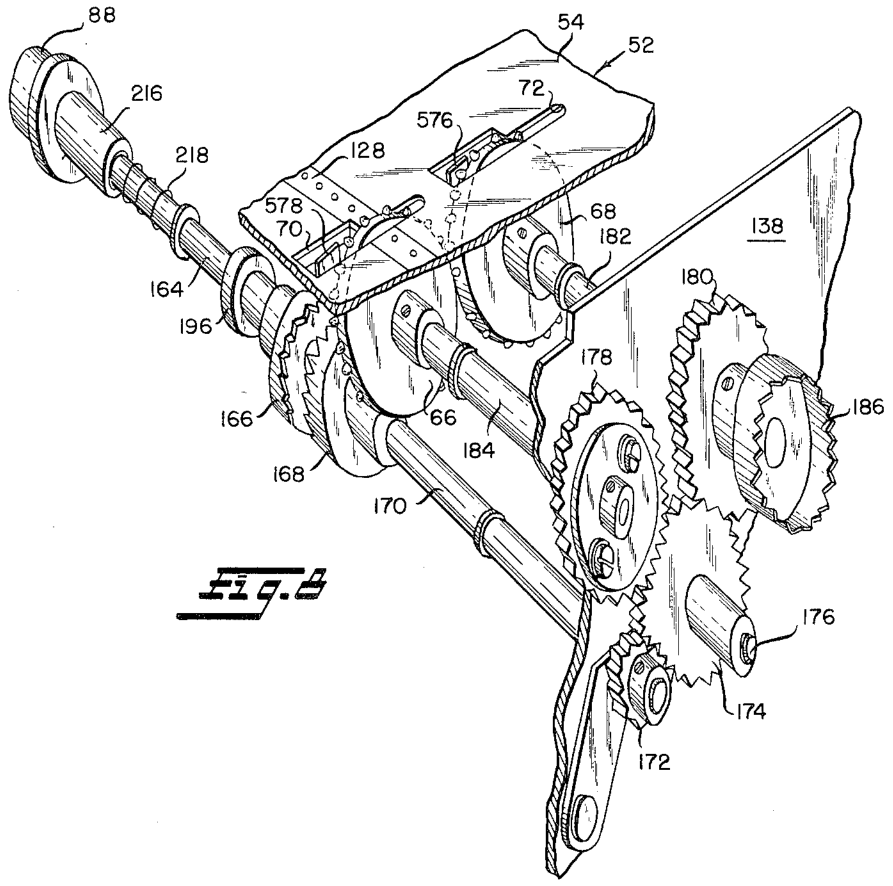
FIGURE 8 is a perspective view of the manual record feed mechanism.
Figure 5:
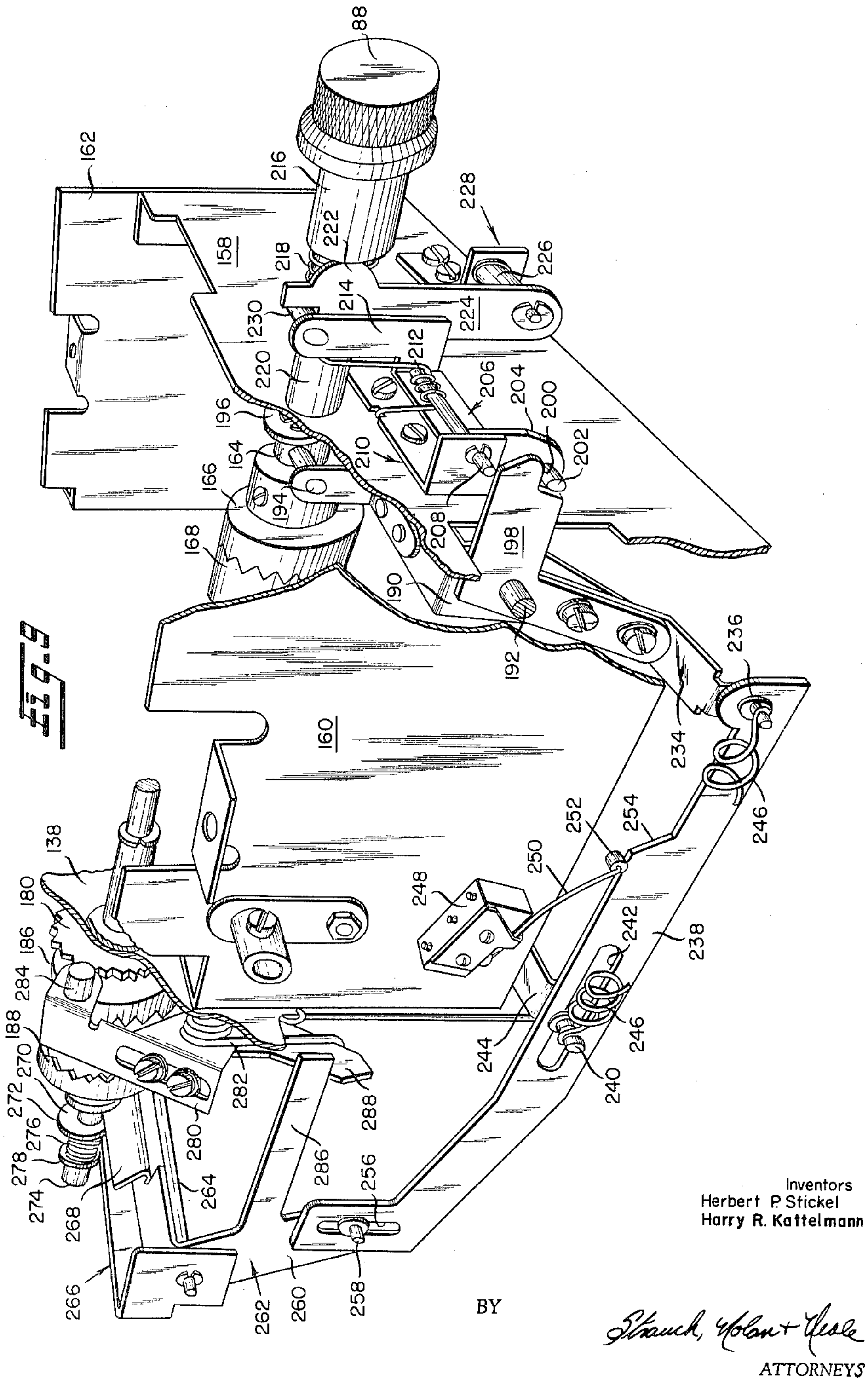

Referring now to FIGURE 8, a pinion 172 is fixed to shaft 170 at the rear of plate 138. Pinion 172 meshes with an idler gear 174 journalled by a stub shaft 176 on plate 138 and in constant mesh with a pair of gears 178 and 180. Gear 180 is fixed to the rear end of shaft 182 projecting through and journalled upon plate 138 and on the forward end of which is fixed the feed sprocket 68. Similarly, gear 178 is fixed to the end of a shaft 184, journalled upon and extending through plate 138 and on the forward end of which is fixed the feed sprocket 66. The axes of shafts 182 and 184 are parallel and define a plane parallel to surface 54 of table 52. Gears 178 and 180 have the same number of teeth so that any given rotation of idler gear 174 will impart equal and like rotation to feed sprockets 66 and 68. Thus, when knob 88 is depressed to engage clutch elements 166 and 168, feed sprockets 66 and 68 can be rotated in either direction by rotary manipulation of knob 88.

A jaw clutch element 186 is fixed to the end of shaft 182. This clutch element 186, when engaged with its complementary clutch element 188 (FIGURE 5), as will be explained presently, will establish a power drive to gears 180, 174 and 178 and sprockets 66 and 68 through shafts 182 and 184.

*Record feed selection*

The mechanism by which selection between manual and power feed of the record is effected is best illustrated in FIGURE 9. In this figure, knob 88 is shown depressed, clutch elements 166 and 168 engaged and clutch elements 186 and 188 disengaged. Axial rearward shifting of shaft 164 from its FIGURE 6 position to its FIGURE 5 position, upon depression of knob 88 to engage clutch elements 166 and 168, pivots a crank 190 in a counterclockwise direction as viewed in FIGURES 5 and 6 about its pivot 192 due to the engagement of its laterally projecting pin 194 with the flange 196 axially fixed on shaft 164. As crank 190 moves counterclockwise in this manner, a latch member 198, adjustably fixed thereto, pivots with crank 190 about pivot 192 from its FIGURE 6 to its FIGURE 5 position to raise its latching surface 200 to a position in which a latching pin 202 can pass therebeneath to the position shown in FIGURES 5 and 9.

As is best shown in FIGURE 9, latching pin 202 is fixed to a depending arm 204 on a crank 206 which is pivotally mounted by a shaft 208 on a support bracket 210 fixed to the front of support plate 158. Crank 206 is biased in a clockwise direction as viewed in FIGURES 5, 6 and 9 by a torsion spring 212 acting between bracket 210 and an upwardly extending arm 214 of crank 206.

Latch pin 202 can be disengaged from latching surface 200 by axial rearward motion and displacement of a collar 216 axially slidably mounted on shaft 164 intermediate knob 88 and plate 158 and biased toward knob 88 by a compression coil spring 218 surrounding shaft 164 intermediate to collar 216 and the bearing bushing 220 fixed to plate 158 by which shaft 164 is supported. The end of collar 216 remote from knob 88 engages an ear 222 on a lever 224 pivotally mounted by a stub shaft 226 and a bracket 228 on plate 158 and having a bifurcated upper end embracing a projecting stud 230 on arm 214 of crank 206. By this construction, rearward axial movement of collar 216 independently of knob 88 will pivot lever 224 and crank 206 counterclockwise as viewed in FIGURE 9 to release latch pin 202 from latching engagement with latch surface 200 when the knob 88 has been previously depressed to engage clutch elements 166 and 168.

In summary of this aspect, upon depression of knob 88, clutch elements 166 and 168 will be engaged and held in engagement by the latching action of crank 206 and latch member 198. Thereafter upon manual depression of collar 216 without touching knob 88, the latching action of latch member 198 and crank 206 will be terminated and clutch elements 166 and 168 disengaged by restoration of shaft 164, clutch element 166, knob 88 and collar 216 to their FIGURE 6 positions under the biasing action of spring 218.

With continued reference to FIGURE 9, a depending arm 234 of crank 190 projects laterally beneath side plate 160 and is pivotally connected at 236 to a slide bar 238. Slide bar 238 is supported by a pin 240 projecting through elongated slot 242 in bar 238 and fixed by a bracket 244 to side plate 160. Bar 238 is biased to the left as viewed in FIGURES 5, 6 and 9 by a tension spring 246 interconnected between fixed pin 240 and pivot 236. The biasing force of spring 246 augments that of spring 218 in restoring the mechanism to its power drive position (FIGURE 6) upon actuation of release collar 216 as described above.

A snap action switch 248 is mounted upon plate 160 and provided with an actuating arm 250 having a cam roller 252 journalled on the end thereof. Roller 252, which engages the upper cam surface 254 of bar 238, is elevated when knob 88 has been depressed for manual feed as in FIGURES 5 and 9 and is lowered when knob 88 is released for power feed as in FIGURE 6 to correspondingly actuate switch 248 to electrically indicate power and manual feed selections under control of knob 88 and collar 216.

Referring again to FIGURE 9, a vertically elongated through slot 256 is formed through bar 238 at its rear upturned end. Slot 256 is engaged by a pin 258 fixed to the depending arm 260 of a power clutch shift member 262. Shift member 262 is pivoted on a shaft 264 supported by a bracket 266 fixed to plate 134 (see also FIGURE 7). Shift member 262 is formed with an upturned flange 268 engaging a circumferential groove 270 in the hub 272 of clutch element 188. Clutch element 188 is fixed for rotation with and axially slidable upon an intermittently rotating power input shaft 274 and is biased toward engagement with clutch element 186 by a compression spring 276 surrounding shaft 274 and compressed between a collar 278 axially fixed thereon and clutch element 188.

Figure 6:
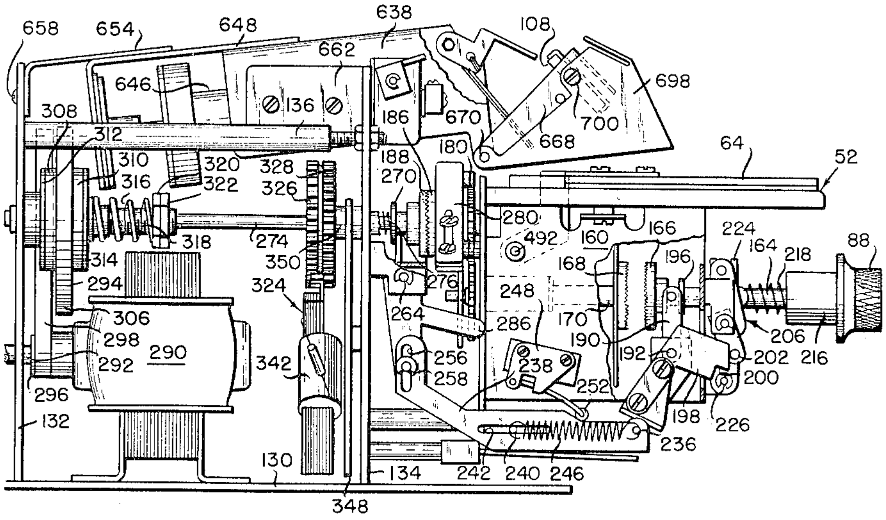
FIGURE 6 is a view similar to FIGURE 5 showing the power record feed engaged and the pivoted record hold-down plate in its record holding position.

By this construction, when bar 238 is pulled forward to the position shown in FIGURES 5 and 9 from its FIGURE 6 position for manual feed, power feed clutch elements 186 and 188 are disengaged by shift member 262.

As is shown in FIGURE 9, a detent member 280 is pivotally mounted on the rear of plate 138 and biased by a torsion spring 282 to a position in which its detent pin 284 is in engagement with the teeth of gear 180. Detent pin 284 is maintained in engagement with the teeth of gear 180 during manual feed to assure proper alignment of the code holes in the record with the photovoltaic cells 112–126 (FIGURE 4). When shift member 262 is restored to its clockwise limit position as shown in FIGURE 6 for power feed operation, its arm 286 engages the arm 288 of detent 280 to pivot its pin 284 from engagement with gear 180 in opposition to the biasing force of spring 282.

*Record feed—Power*

Figures 10, 11:
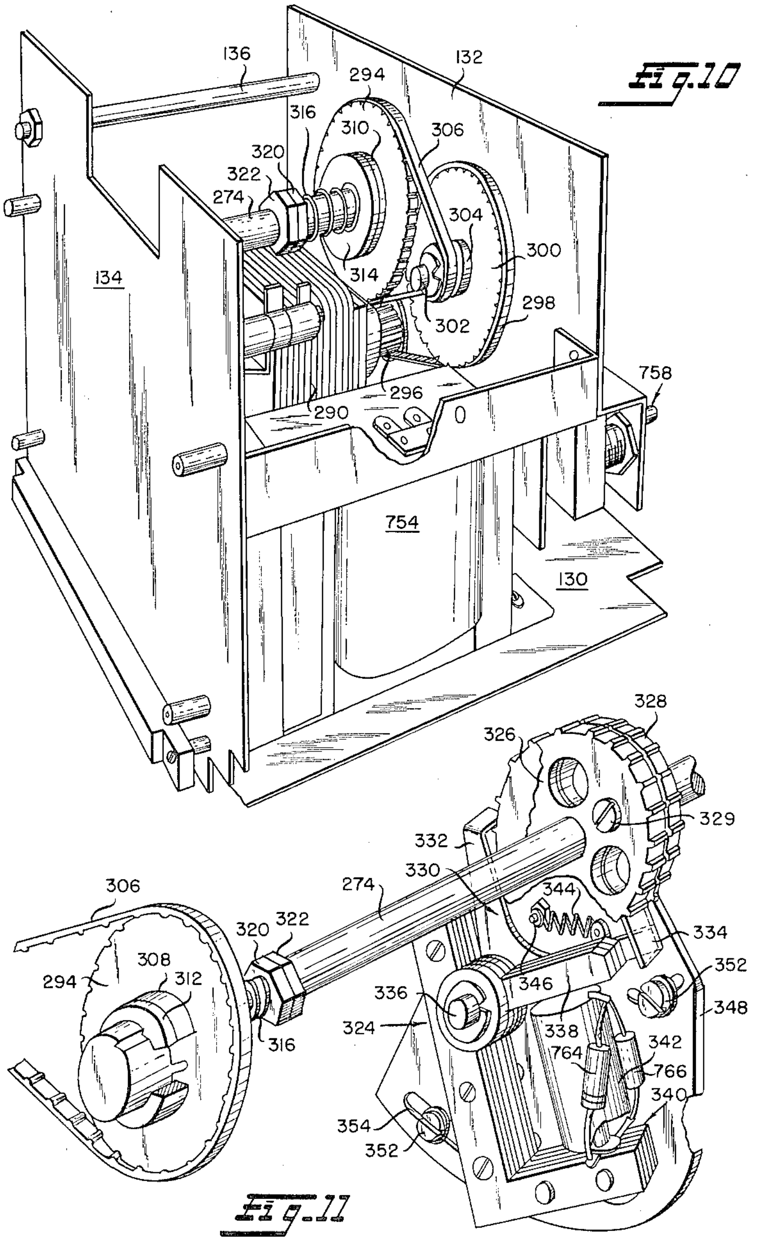
FIGURE 10 is a perspective view of the power input portion of the power record feed mechanism drive train.
FIGURE 11 is a perspective view of the stepping mechanism of the power input drive train of the power record feed mechanism.

As has been indicated, FIGURE 6 shows the record feed selection mechanism in its power feed position. For power feed, intermittent rotation is imparted to shaft 274, to which clutch element 188 is fixed for rotation, from a continuously energized electric motor 290 fixed to base plate 130. Referring to FIGURES 6 and 10, the rotor shaft 292 of motor 290 is drive connected to a pulley 294 rotatably mounted in shaft 274 by a drive train comprising a pulley 296 fixed to shaft 292, a belt 298 driven by pulley 296, a pulley 300 journalled by a stub shaft 302 on support plate 132 and driven by belt 298, a pulley 304 fixed to pulley 300, and a belt 306 drive connecting pulleys 304 and 294. As is shown, pulleys 296, 300, 304 and 294 are provided with external teeth meshing with the internal teeth of belts 298 and 306 to provide a positive drive between motor 290 and pulley 294.

Pulley 294 forms the power input element of a friction clutch interposed in the drive train between motor 290 and shaft 274. Pulley 294 is embraced by a pair of felt friction discs 308 and 310 (FIGURE 6), disc 308 being backed by a rigid metal disc 312 fixed to shaft 274 and disc 310 being backed by rigid metal disc 314 fixed for rotation with and mounted for axial sliding movement relative to shaft 274. Disc 314 is biased toward pulley 294 by a compression spring 316 surrounding the threaded portion 318 of shaft 274 and compressed against disc 314 by a pair of nuts 320 and 322 threaded on threaded portion 318 and locked in position by being tightened together. By this construction, motor 290 tends to drive shaft 274 and will drive shaft 274 so long as shaft 274 is not positively restrained from rotation.

The rotation of shaft 274 under the influence of motor 290 is confined to movement in intermittent steps by an electromagnetically actuated escapement mechanism 324 mounted on plate 134 as shown in FIGURES 5 and 6 and the details of which are best shown in FIGURE 11. Escapement mechanism 324 includes a pair of toothed escapement wheels 326 and 328, wheel 328 being fixed to shaft 274 and wheel 326 being circumferentially adjustably fixed by screws 329 to wheel 328 with its teeth in slightly offset circumferential relation relative to the teeth of wheel 328. An escapement pawl 330, having arms 332 and 334 co-acting with the teeth of wheels 328 and 326 respectively, is pivoted upon a stub shaft 336. Pawl 330 is actuated by an armature 338 pivoted on shaft 336 and fixed to pawl 330 and a fixed electromagnet 340 having a coil 342 positioned to attract armature 338 when energized. By this construction, so long as coil 342 remains de-energized, pawl arm 334 will remain in engagement with a tooth of wheel 326 and thereby prevent rotation of shaft 274. When coil 342 is energized, pawl arm 334 will be disengaged from wheel 326 and pawl arm 332 positioned to engage the next tooth on wheel 328. This permits shaft 274 to rotate a fraction of a step to move the tooth on wheel 326 previously engaged by pawl arm 334 past pawl arm 334. Upon de-energization of coil 342, pawl 330 will restore to its de-energized position as shown under the resilient bias of tension spring 344 connected between pawl 330 and a fixed spring stud 346. When pawl 330 is so restored, pawl arm 334 will be restored to position to engage the next tooth of wheel 326 and pawl arm 332 will be disengaged from wheel 328 to permit shaft 274 and wheels 326 and 328 to advance until the next tooth on wheel 326 engages pawl arm 334 to thereby complete a step of shaft 274.

It will be recalled by reference to FIGURES 6 and 8 that, with clutch elements 186 and 188 engaged, shaft 274 is drive connected to sprocket wheels 66 and 68. The magnitude of each step of shaft 274, as controlled by escapement mechanism 324, is such that a record fed by feed sprockets 66 and 68 is advanced exactly one code space, that is, a distance equal to the longitudinal center to center spacing between adjacent transverse rows of code holes in either the tape 74 (FIGURE 2) or the card 90 (FIGURE 3).

Figures 29, 30:
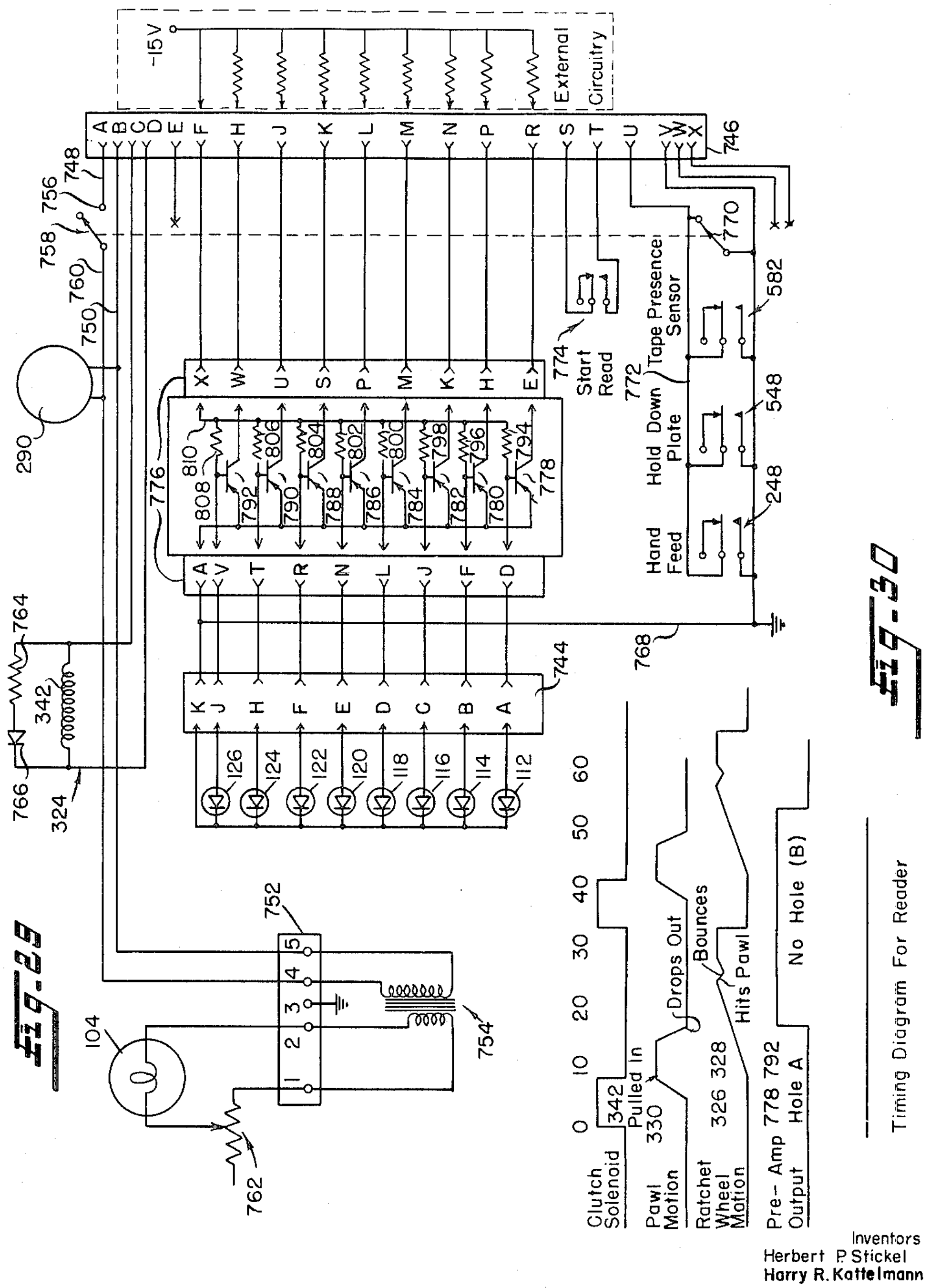
FIGURE 29 is a circuit diagram of the reader of FIGURE 1.
FIGURE 30 is a timing diagram of the operation of the reader of FIGURE 1.

In normal operation, coil 342 is energized by an impulse of a predetermined duration (eight milliseconds in the preferred embodiment) such that the pawl arm 332 never actually contacts teeth of escapement wheel 328 because the armature 338 and pawl 330 are released by coil 342 before contact between pawl arm 332 and escapement wheel 328 can occur. Thus the movement of shaft 274, in practice, is step by step with no hesitation during the step. The actual timing is shown in FIGURE 30 on a horizontal scale calibrated in milliseconds. If, however, coil 342 (FIGURE 11) is continuously energized, shaft 274 will take a fraction of a step rather than continuing intermittent rotation to feed out the tape or card as in known prior constructions.

For ease of assembly and adjustment, the stub shaft 336 and the electromagnet 340 are mounted in a separate support plate 348 disposed adjacent plate 134 and having a bushing 350 (FIGURE 6) fixed thereto and through which shaft 274 extends. Plate 348 is fixed to plate 134 by two lock screws 352 (FIGURE 11) extending through an elongated arcuate aperture 354 formed about the axis of shaft 274 as a center. Screws 352 are threaded into cooperating apertures in plate 134. In this manner, the entire escapement 324 can be pivoted about the axis of shaft 274 to determine the end of step stop positions of shaft 274 and then fixed in place by tightening screws 352. This provides an adjustment by which the record code holes can be properly positioned along the path of record travel with respect to photovoltaic cells 112–126 (FIGURE 4) for reading.

*Record guide structure*

Figures 12, 16:
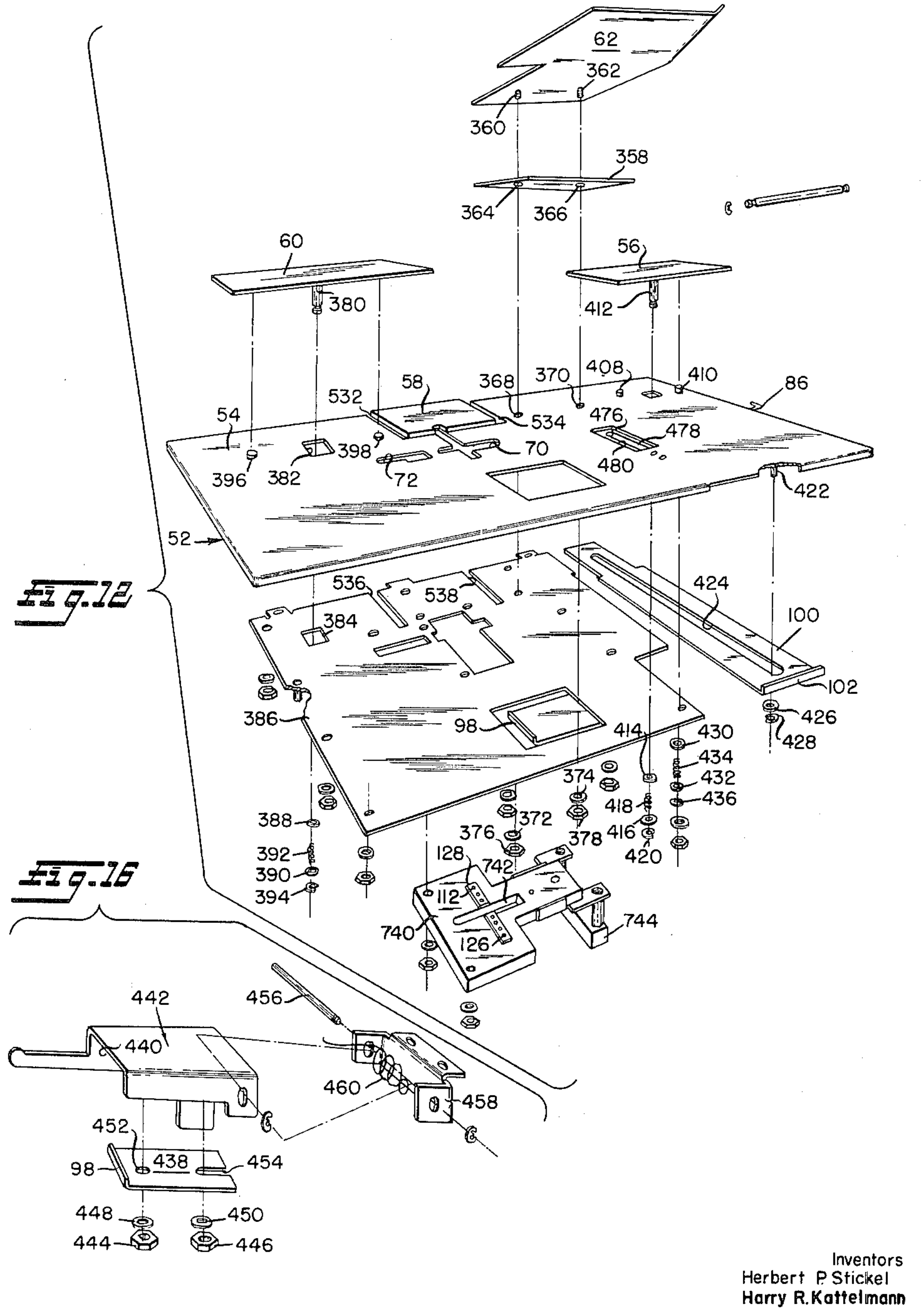
FIGURE 12 is an exploded perspective view of the record support table.
FIGURE 16 is an exploded perspective view of the card stop mechanism.

The structure of the record support table 52 and its related record guides is best illustrated in FIGURE 12.

The fixed hold-down plate 62 is maintained in slightly spaced relation to the top surface 54 of table 52 by a spacer plate 358 and plates 62 and 358 are fixed to table 52 by threaded studs 360 and 362 fixed to and projecting from the bottom of plate 62 through apertures 364 and 366 respectively in plate 358, apertures 368 and 370 in table 52, and washers 372 and 374 into threaded engagement with nuts 376 and 378.

Figure 18:
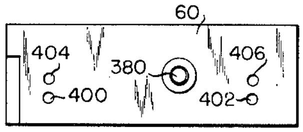
FIGURE 18 is a bottom plan view of the record edge guide of FIGURE 17, being in effect, a section along the line 18—18 of FIGURE 17.
Figure 19:
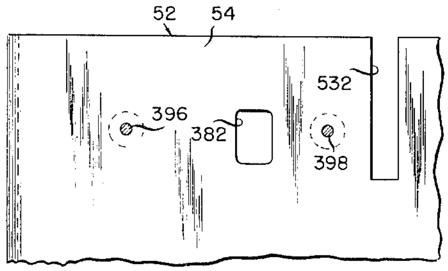
FIGURE 19 is a fragmentary top plan view of the portion of the record support table beneath the record edge guide of FIGURE 17, being in effect, a section along the line 19—19 of FIGURE 17.
Figure 20:
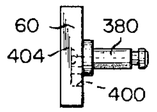
FIGURE 20 is a side elevational view of the record edge guide of FIGURE 17.

Edge guide 60 is resiliently retained against the surface 54 of table 52 by the co-action of a stud 380 fixed to and projecting from the bottom of guide 60 through apertures 382 and 384 in table 52 and table sub-plate 386 with washers 388 and 390, coil compression spring 392 and a spring clip 394 which are received upon stud 380. The details of this mounting of guide 60 are best shown in FIGURES 17 to 20 on sheet 2. As is shown in FIGURE 19, aperture 382 in table 52 is elongated transversely of the direction of record movement over table 52 so that stud 380 and guide 60 can be displaced within limits. The lateral position of guide 60 is determined by alternatively engaging the ends of positioning studs 396 and 398 which project above the surface 54 of table 52 with either recesses 400 and 402 respectively or with recesses 404 and 406 respectively formed in the bottom face of guide 60 in laterally offset relation as shown in FIGURES 18 and 20. Studs 396 and 398 are engaged with recesses 400 and 402 for five channel records and with recesses 404 and 406 for six, seven or eight channel records.

Edge guide 56 (FIGURE 12) is constructed and mounted in the same manner as edge guide 60, being positioned by studs 408 and 410 and resiliently retained by stud 412, washers 414 and 416, spring 418 and spring clip 420.

Figure 14:
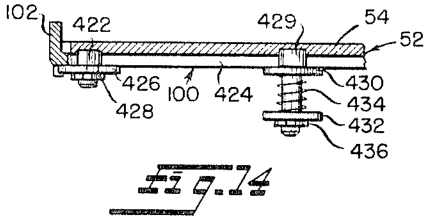
FIGURE 14 is a fragmentary sectional view of the adjustable card guide taken substantially along the line 14—14 of FIGURE 13.

Card guide 100 as is best shown in FIGURE 14 is supported by a stud 422 fixed to and projecting from the lower side of table 52 through an elongated aperture 424 of guide 100, and by a washer 426 and spring clip 428 received in stud 422. Guide 100 is frictionally retained in its adjusted position by the co-action of a further stud 429, fixed to table 52 in transverse alignment with stud 422 and projecting through slot 424, with washers 430 and 432, spring 434 and spring clip 436.

Figure 13:
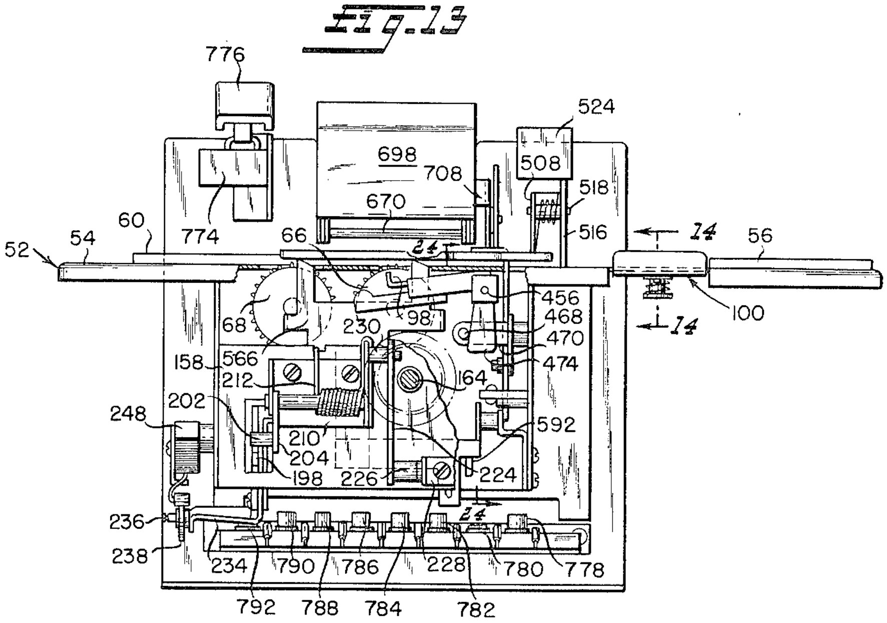
FIGURE 13 is a front elevational view, partially in section, of the reader of FIGURE 1 with the cover removed.
Figure 15:
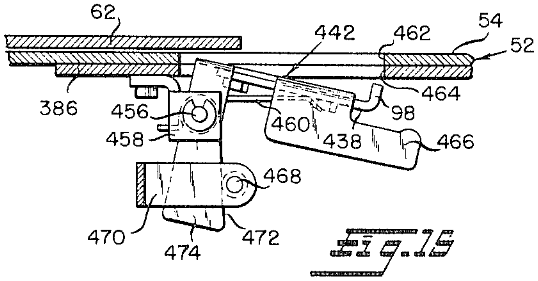
FIGURE 15 is a fragmentary sectional view of the card stop mechanism as viewed from the rear thereof, and taken substantially along the line 15—15 of FIGURE 1.

The structure of the card stop 98 is best shown in FIGURES 13, 15 and 16. Referring to FIGURE 16, the stop 98 is the upturned edge of a plate 438 secured within a downwardly open channel 440, defined by a member 442, by nuts 444 and 446 and washers 448 and 450 engaging threaded studs fixed to the bottom face of member 442 and projecting through apertures 452 and 454 in member 438. Member 442 is pivoted by a shaft 456 upon a bracket 458 and resiliently biased in a clockwise direction as viewed in FIGURE 16 by a torsion spring 460. As is shown in FIGURE 15, bracket 458 is fixed to the underside of sub-plate 386 with members 442 and 438 in vertical alignment with aligned apertures 462 and 464 in table 52 and sub-plate 386 respectively. The upward limit of pivotal movement of stop 98 under the influence of spring 460 is established by the engagement of an arm 466 on member 442 with the lower face of sub-plate 386. In this position, stop 98 projects above the level of surface 54 of table 52 into the path of card movement over surface 54 as explained in reference to FIGURE 1 to align the first row of code holes of a record card with the photovoltaic cells 112–126. So long as the pivoted hold-down plate 64 is in its record holding position, as illustrated in FIGURE 1, a stud 468 (FIGURE 15) on an arm 470 will co-act with the cam edge 472 of depending arm 474 of member 442 to retain stop 98 in its depressed inoperative position illustrated in FIGURE 15. The mechanism interconnecting the pivoted hold-down plate 64 and arm 470 will be described presently.

Referring again to FIGURE 12, the record, if a card, is frictionally supported against the undersurface of fixed hold-down plate 62 by a pressure pad 476 resiliently supported by a leaf spring 478 through an aperture 480 in table 52.

Figure 21:
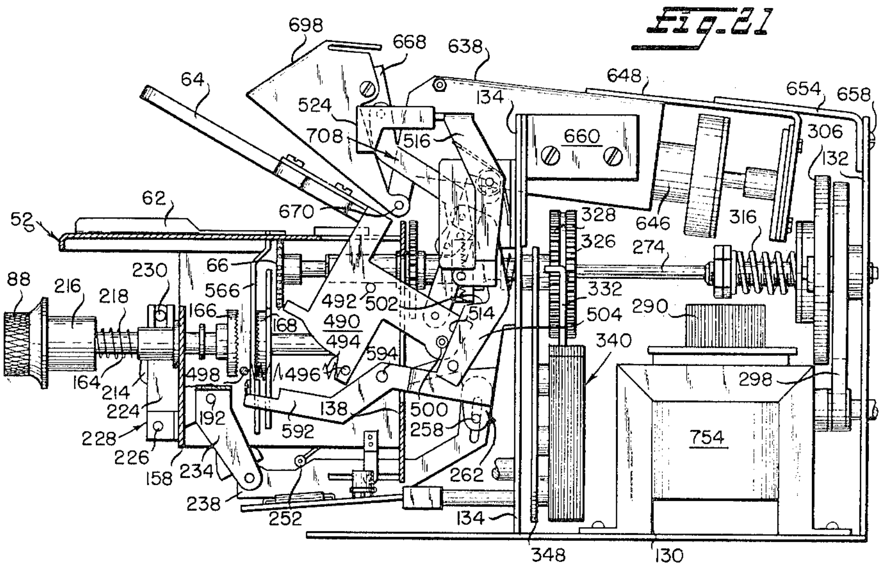
FIGURE 21 is a right side elevational view, partially in section of the reader of FIGURE 1 with its cover removed showing the pivoted record hold-down plate in its elevated position and the power record feed engaged.
Figure 22:
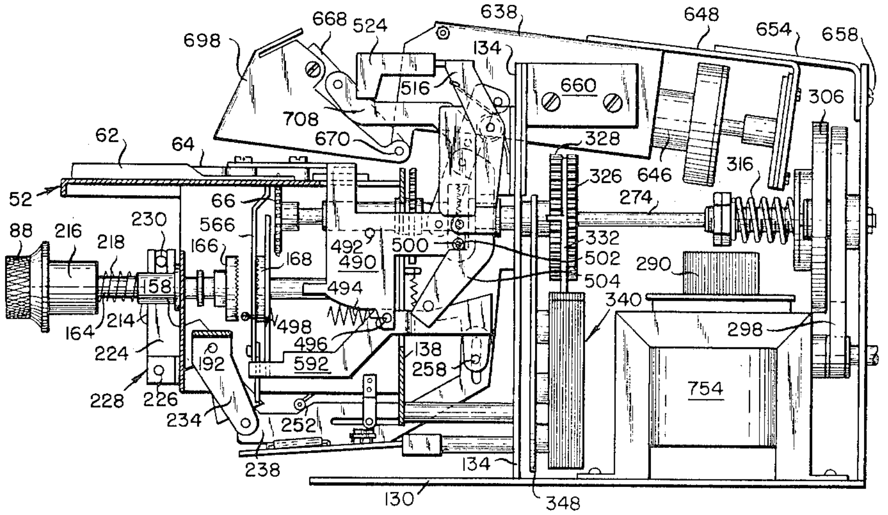
FIGURE 22 is a view similar to FIGURE 21 showing the record hold-down plate in its record holding position.
Figure 23:
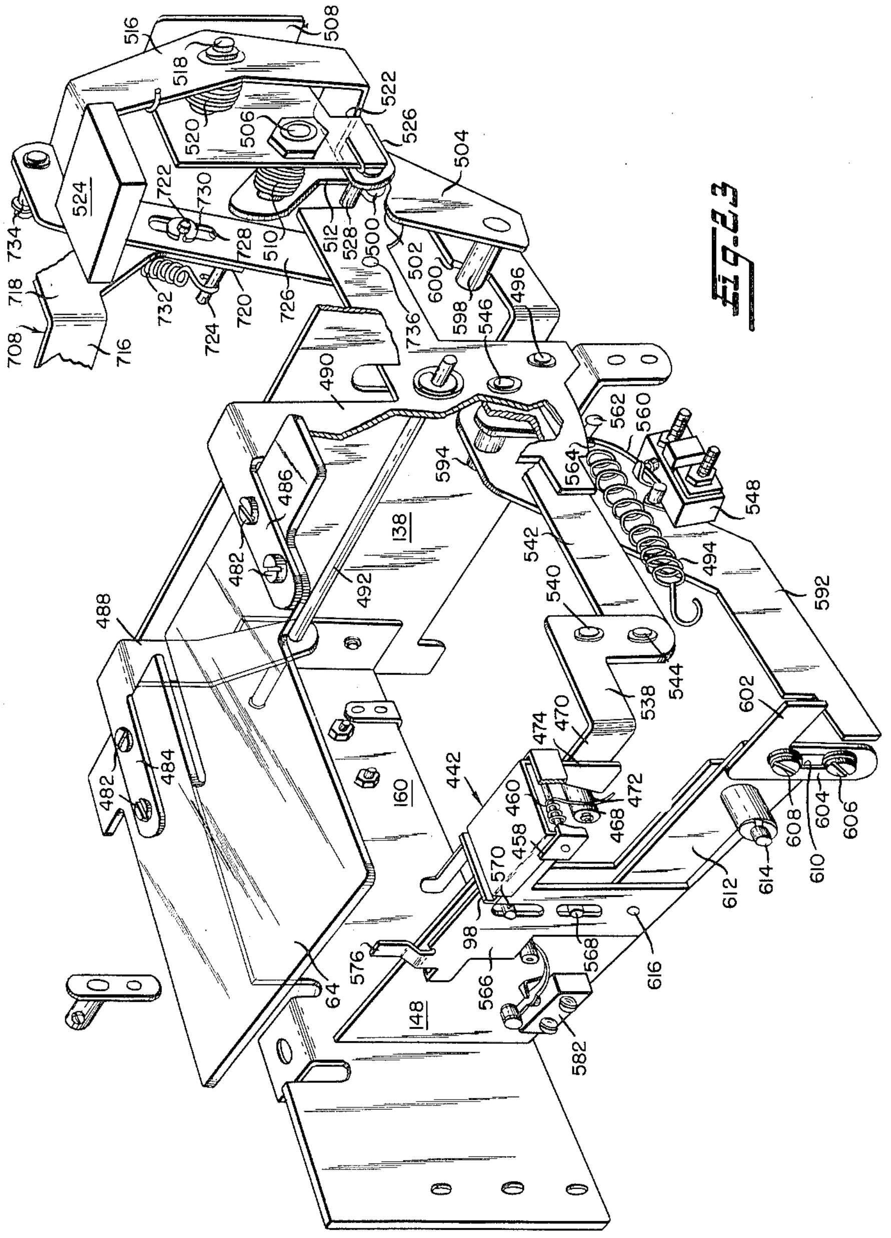
FIGURE 23 is a perspective view of the record hold-down plate actuating and record presence sensing mechanisms.
Figure 24:
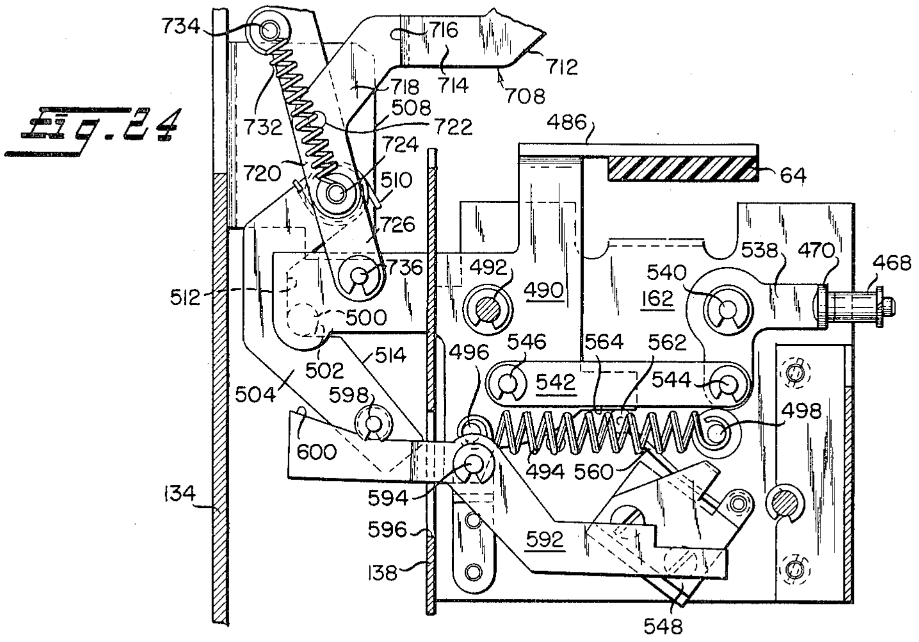
FIGURE 24 is a fragmentary sectional view taken substantially along the line 24—24 of FIGURE 13 showing a portion of the record hold-down plate actuating mechanism.

The mechanism by which the pivoted record hold-down plate 64 is positioned is illustrated in FIGURES 21 through 24. Referring to FIGURE 23, plate 64 is secured by screws 482 to the under surfaces of the forwardly extendnig arms 484 and 486 of support members 488 and 490. Members 488 and 490 are pivotally mounted upon a shaft 492 supported by side plates 160 and 162 (see also FIGURE 7). Members 488 and 490 and plate 64 are resiliently biased toward the elevated position of plate 64 shown in FIGURE 21 by a tension spring 494 extending between a spring stud 496 on member 490 (see FIGURES 22, 23 and 24) and a spring stud 498 fixed to the interior of side plate 162 (FIGURE 24).

After plate 64 has been depressed by manual pressure on its top face from its FIGURE 21 position to its FIGURE 22 position, it is retained in its depressed position by the engagement of a stud 500 fixed to member 490 with the surface 502 of a latch or detent member 504. Latch member 504 is pivotally mounted on a stub shaft 506 fixed upon a bracket 508 mounted on the support plate 138 as shown in FIGURE 24. Latch member 504 is resiliently biased in a counterclockwise direction as viewed in FIGURE 24 by a torsion spring 510 on stub shaft 506 (FIGURE 23), the limit of its motion being defined by the engagement of its surface 512 with stud 500 on member 490 when plate 64 is depressed and by the engagement with stud 500 of its surface 514 when plate 64 is elevated as in FIGURE 21.

Detent 504 is controlled by a lever 516 (FIGURE 23) which is pivotally mounted by a stud 518 on bracket 508 and resiliently biased in a clockwise direction as viewed in FIGURE 23 by a torsion spring 520 on stud 518 into engagement with the edge 522 of bracket 508. At its upper end lever 516 has a key 524 which may be depressed manually to pivot lever 516 counterclockwise (see also FIGURE 1). At its lower end lever 516 has a depending ear 526 from which laterally projects a stud 528 in front of the surface 512 of detent 504. Thus, upon depression of key 524, lever 516 pivots counterclockwise to engage stud 528 with surface 512 of detent 504 to, in turn, pivot detent 504 counterclockwise about shaft 506 to disengage surface 502 from stud 500 on member 490 and thereby permit members 488 and 490 and plate 64 to pivot to their elevated position as illustrated in FIGURE 21 under the influence of tension spring 494. The members 488 and 490 in this movement move in the slots 530, 532, 534 and 536 in the table 52 and sub-plate 386 shown in FIGURE 12.

As is apparent from FIGURE 23, the stud 468 on arm 470, which engages arm 474 to depress the card stop 98 when hold-down plate 64 is in its depressed position, is mounted on a bell crank 538 pivoted on a stud 540 fixed to side plate 162 (see FIGURE 24). Bell crank 538 is connected to member 490 by a link 542 which is pivoted to bell crank 538 at 544 and to member 490 at 546.

With continued reference to FIGURE 24, the position of hold-down plate 64 is electrically sensed by a snap action switch 548 having an actuating arm 560 terminating in a roller 562 engaging the surface 564 of member 490. So long as plate 64 is depressed, arm 560 will be. When plate 64 is raised, arm 560 will rise and switch 548 actuated accordingly.

Figure 25:
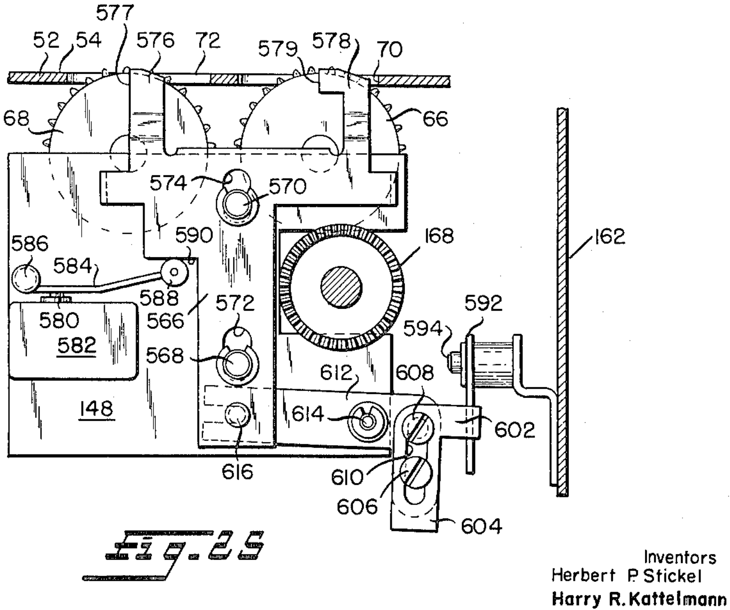
FIGURE 25 is a front elevational view of the record presence sensing mechanism.

Referring again to FIGURE 23, detent 504, in addition to co-acting with the hold-down plate 64, and the card stop 98 disenables the record presence sensing mechanism. This mechanism, best shown in FIGURES 23 and 25, comprises a member 566 mounted, by studs 568 and 570 projecting through its vertically aligned elongated slots 572 and 574 respectively, for limited vertical reciprocation upon the front face of support plate 148. Member 566 has a pair of integral record presence sensing fingers 576 and 578 disposed in juxtaposition to the feed sprockets 68 and 66 respectively in the openings 72 and 70 in the table 52 as is best shown in FIGURE 8. The record will be fed from right to left as viewed in FIGURE 25. The edges 577 and 579 of the fingers 576 and 578 respectively, lie in planes including the axes of sprocket wheels 68 and 66 respectively normal to the surface 54 of table 52. Member 566 is resiliently supported in its upper position as shown in FIGURE 25 in which the tips of fingers 576 and 578 project slightly above the level of the top surface 54 of table 52 by the upwardly spring biased actuator button 580 of a switch 582 fixed to plate 148 and the actuator arm 584 pivoted in plate 148 at 586, resting upon button 580 and having a roller 588 underlying the edge 590 of member 566. So long as any portion of a record is disposed on surface 54 of table 52 above either finger 576 or finger 578, with hold-down plate 64 depressed, member 566 will be depressed to actuate switch 582 to electrically indicate the presence of a record in the record sensing station.

When hold-down plate 64 is released to its elevated position by depression of key 524 (FIGURE 23) detent 504 operates to depress member 566 and actuate switch 582. For this purpose, a lever 592 (FIGURE 24) is pivoted by a stud 594 upon plate 162. Lever 592 has a rearwardly extending portion projecting through an aperture 596 in plate 138 and underlying a stud 598 on detent 504. This portion of lever 592 has an upwardly sloping cam surface 600 engaging stud 598 so that, when detent 504 pivots in a clockwise direction as viewed in FIGURE 24, about its pivot stub shaft 506, lever 592 is pivoted in a counterclockwise direction. As is shown in FIGURES 23 and 25, the forward end of lever 592 extends beneath an ear 602 of a member 604. Member 604 is mounted for limited translatory adjusting movement and fixed, by screws 606 and 608 extending through its elongated slot 610, relative to a bell crank 612 pivoted at 614 on plate 148. The opposite end of bell crank 612 is bifurcated and embraces a stud 616 fixed to member 566. Thus when lever 592 is pivoted by detent 504 in a clockwise direction as viewed in FIGURE 23, its forward end will rise, first lifting member 604 and pivoting member 604 and bell crank 612 as a unit about stud 614 to depress member 566 through the engagement of bell crank 612 with stud 616.

*Optical system*

As was pointed out in the General Description above, in reference to FIGURE 4, the optical system comprises essentially a lamp 104, a focusing lens assembly 106, a mirror 108 and a plurality of photovoltaic cells 112–126 equal in number to the potential number of code holes in any one transverse row across the record. The subassembly of these components with the exception of the photovoltaic cells is illustrated in FIGURE 26; the lens assembly 106 is illustrated in FIGURE 27 and the photovoltaic cell mounting is illustrated in FIGURE 28.

Figures 26, 27, 28:
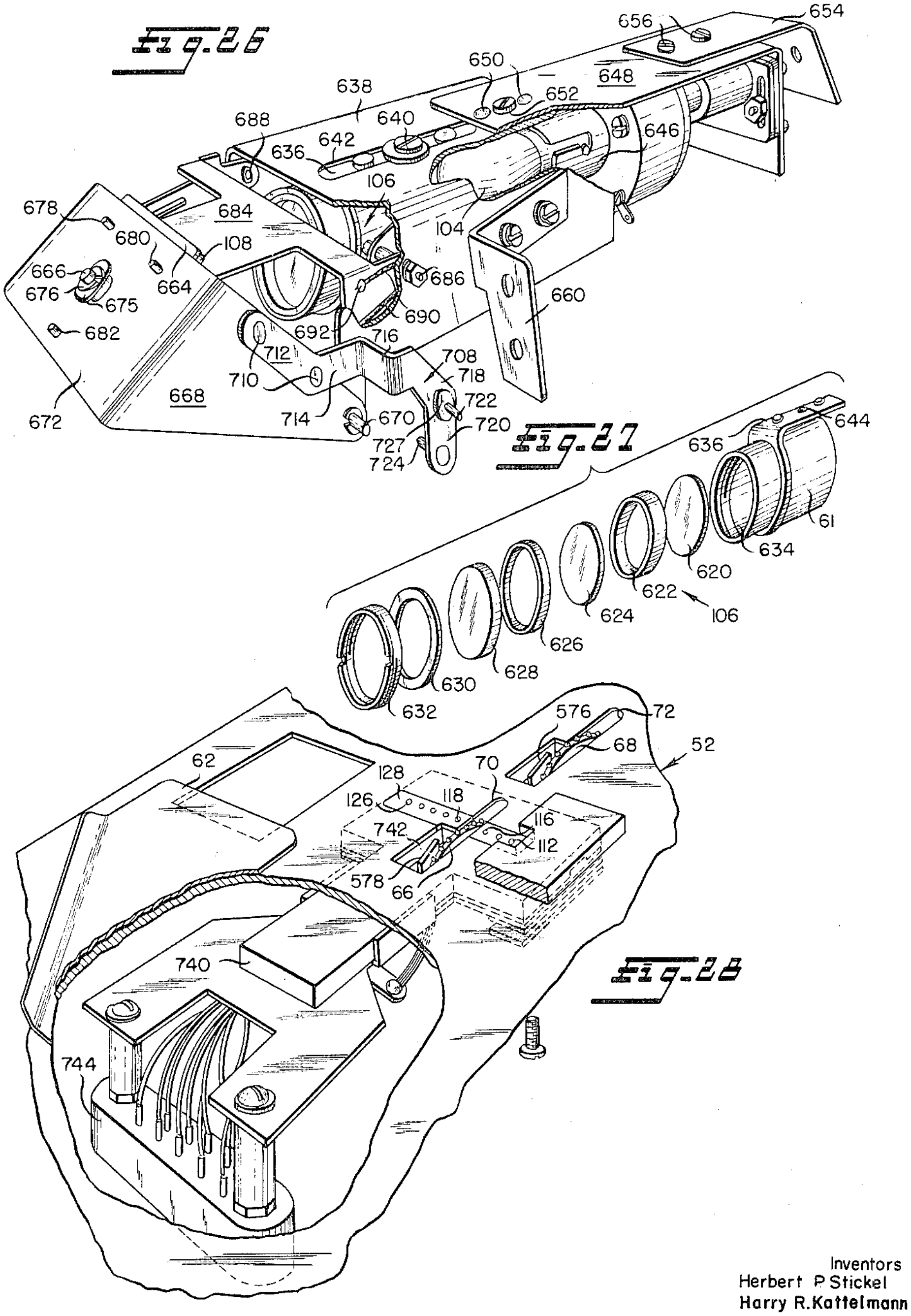
FIGURE 26 is a perspective view partially in section of the optical system of the reader of FIGURE 1.
FIGURE 27 is an exploded perspective view of the lens assembly of the optical system of FIGURE 26.
FIGURE 28 is a fragmentary perspective view of the record sensing station of the reader of FIGURE 1.

Referring first to FIGURE 27, the lens assembly 106 comprises a tubular housing 618 in which are mounted in series a lens 620, a spacer ring 622, a lens 624, a spacer ring 626, a red filter glass 628, a spacer ring 630 and an externally threaded retainer ring 632 adapted for threaded engagement with the internally threaded end 634 of housing 618. A mounting bracket 636 is fixed to housing 618 as shown.

As is shown in FIGURE 26, lens assembly 106 is disposed within a downwardly open channel shaped hood 638, being longitudinally adjustably mounted therein by a screw 640 passing through a longitudinally elongated slot 642 in hood 638 and threaded into the aperture 644 of bracket 636 (FIGURE 27). As is shown in FIGURE 26, the lamp 104 is received in a bayonet socket 646 mounted upon an L-shaped bracket 648 positioned relative to and secured to hood 638 by studs 650 and screw 652 and is secured to the rear support plate 132 by a further L-shaped bracket 654 and screws 656 and 658 as shown in FIGURE 4. Hood 638 is attached to support plate 134 by side brackets 660 and 662 (see FIGURES 5 and 21).

Referring again to FIGURES 4 and 26, the mirror 108 is mounted in a frame plate 664 (FIGURE 4) from the opposite face of which projects a stud 666. Mirror 108 and plate 664 are mounted upon a member 668 of U-shape in cross section which is pivoted by a shaft 670 to the bottom forward corners of the side walls of hood 638. Plate 664 is mounted on the base wall 672 of member 668 by the stud 666 which passes through an aperture in wall 672, and receives a compression spring 674, a washer 675 and a spring clip 676 thereon. The position of mirror 108 is adjusted by cooperative adjustment of three screws 678, 680 and 682 to properly focus the light beam upon the photovoltaic cells 112–126 when member 668 is in its position as shown in FIGURE 4.

A light shutter plate 684 is pivotally mounted upon the side walls of hood 638 by pivot studs 686 and 688 for movement between its open position as shown in FIGURE 26 and a substantially vertical closed position in front of the lens assembly 106 as shown in FIGURE 5 in which position it is effective to block the beam of light from lens assembly 106 to prevent it from shining in the operator's eyes. Shutter 684 is connected to member 668 by a flexible cable 690 connected to shutter 684 at 692 (FIGURE 26), passing around the pivot 686 and connected to member 668 at 694 (FIGURE 4). Shutter 684 is biased toward its closed position by a torsion spring 696. By this construction, when member 668 is pivoted in a counterclockwise direction from its position as shown in FIGURE 4 to remove mirror 108 from the beam of light from lens assembly 106, shutter 684 is pivoted in a clockwise direction to its closed position to intercept that beam. When mirror 108 is again lowered, shutter 684 will be again opened.

In final assembly, the mirror 108, and member 668 are protected by a U-shaped cover 698 (FIGURE 5) fixed to member 668 by screws 700 (FIGURE 6) and by an overlapping fixed cover 702 (FIGURE 1) forming a forward extension of the front plate 704 of the top half 706 of the casing of reader 50.

As is apparent from a comparison of FIGURES 21 and 22, the mirror 108 and its cover 698 is elevated when the card hold-down plate 64 is elevated to permit insertion of a record into the reader and is lowered to its card reading position when plate 64 is lowered to its record retaining position.

For this purpose, a link 708 (FIGURE 26) is fixed to one side of member 668 by rivets 710. Link 708 has an upwardly inclined portion 712 parallel to the side of member 668, a rearwardly extending portion 714 in the same plane as portion 712, a laterally extending portion 716 extending perpendicular to portion 714, a rearwardly and downwardly extending portion 718 extending perpendicular to portion 716 and a downwardly extending portion 720 in the same plane as portion 718 and from the opposite sides of which project studs 722 and 724. With reference now to FIGURE 23, portion 720 of link 708 is disposed in side by side spaced relation with a link 726, being spaced therefrom by spacer 727 (FIGURE 26), its stud 722 projecting through an elongated slot 728 in link 726 and retained by a spring clip 730. Link 708 is biased upwardly along link 726 by a tension spring 732 connected between stud 724 on link 708 and a stud 734 on link 726. At its lower end, link 726 is pivotally connected to the member 490 at 736 (FIGURE 24). Thus, with reference to FIGURES 23 and 26, when the key 524 is depressed to release member 490 from latch 504, member 490 will pivot in a clockwise direction under the influence of spring 494. As member 490 pivots in this manner it will lower link 726, relieving the tension of spring 732. When the upper end of slot 728 reaches stud 722, continued motion of link 726 will pivot link 708, the member 668 and mirror 108 clockwise about shaft 670, thus elevating mirror 108 and closing shutter 684. Conversely, when plate 64 is pressed down, member 490 will pivot counterclockwise about shaft 492 and elevate link 726. As link 726 rises member 668 and mirror 108 will pivot counterclockwise about shaft 670 to the limit of their travel as established by the pin and slot connection of link 739 (FIGURE 5) to member 668 and open shutter 684. Continued upward movement of link 726 will stretch spring 732 as hold-down plate 68 is moved to its fully depressed position as established by detent 504 (FIGURE 23).

The remaining portion of the optical system to be described is the photovoltaic cell mounting. This is best shown in FIGURE 28. The photovoltaic cells 112 through 126 are mounted in a plate 740 beneath the transparent window 128. Plate 740 is secured to the bottom of sub-plate 386 of table 52 (FIGURE 12) and is provided with a through aperture 742 to accommodate sensor finger 578 and feed sprocket 66 between photovoltaic cells 116 and 118 and a plug-in connector 744 through which individual and a common connection to the photovoltaic cells 112–126 are made as will be explained in reference to FIGURE 29.

*Electrical circuitry*

The electrical circuitry of reader 50 is illustrated in FIGURE 29. Electrical power and all input and output signals are transmitted to and from reader 50 through a single plug-in connector 746. Alternating current power is supplied through pins A and B of connector 746 to lines 748 and 750. Line 750 is connected to one side of motor 290 and through pin 5 of a terminal block 752 to one side of the primary winding of a transformer 754 (see also FIGURES 21 and 22). Line 748 is connected to one input terminal 756 of a single throw double pole power switch 758 which, when shifted from its "off" position, as shown, to its "on" position, connects line 748 to a line 760. Line 760 is connected to the opposite terminal of motor 290 and through terminal 4 of block 752 to the other side of the primary winding of transformer 754. Lamp 104 is connected through a rheostat 762 and terminal 1 of block 752 and through terminal 2 of block 752 to the opposite sides of the secondary winding of transformer 754. Thus, so long as switch 758 is "on," motor 290 is running and lamp 104 is lighted. The brilliance of lamp 104 is adjustable by rheostat 762 for a purpose to be explained presently.

The coil 342 of the escapement mechanism 324 (see FIGURE 11) is connected across pins C and D of connector 746, a resistor 764 and diode 766 being connected in parallel with it to suppress inductive currents upon termination of the appropriately polarized normal eight millisecond actuating pulse applied across terminals C and D of connector 746 from the external apparatus to which the reader 50 is to be connected.

Ground is applied to the reader 50 through pin V of connector 746 to internal ground line 768. Pin U of connector 746 will be connected to ground line 768 if any of several interlock switches are closed. Hand feed switch 248 (see also FIGURES 5 and 6), hold-down plate switch 548 (see also FIGURE 23), tape presence sensor switch 582 (see also FIGURES 23 and 25) and switch blade 770 of power switch 758 are connected between line 768 and line 772 as shown in FIGURE 29. If the knob 88 has been depressed, switch 248 will be closed. If the hold-down plate 64 is in its elevated position switch 548 will be closed. If there is no record in the sensing station, switch 582 will be closed. If the power switch 758 is off, switch blade 770 will be closed. Thus, if any of these conditions exist, line 772 and pin U of connector 746 will be grounded. This ground on pin U of connector 746 is effective upon the external circuit to provide the required indication that reader 50 is not in condition for operation. The absence of ground on pin U of connector 746 provides an electrical indication that the reader 50 is operable.

A momentarily actuated switch 774, actuatable by momentary depression of the key 776 (FIGURE 1) is connected between terminals S and T of connector 746. Switch 774 in conjunction with the circuitry of the associated equipment (not shown) provides means at reader 50 by which the operator can initiate record feed and reading by the reader 50.

The photovoltaic cells 112–126 are each devices which convert light energy directly into electrical power. The specific cells used in the illustrated embodiment contain, as important components, silicon material and a p–n junction. The term p–n junction stands for the boundary layer between the p-type and n-type semiconducting material. Such a layer exhibits rectifying properties. Light being absorbed in the silicon frees electric charge carriers (electrons and "holes"), some of which are collected and separated by the junction. This separation of charges causes a voltage to appear across the junction, or a current to flow through a circuit connected to the cell. One side of each of the photovoltaic cells 112–126 is connected in common through pin K of connector 744 to ground line 768. The other terminals of photovoltaic cells 112–126 are connected individually through pins A–J respectively of connector 744 and pins D, F, J, L, N, R, T and V respectively of connector 776 to the bases of transistors 778–792 respectively. The emitters of transistors 778–792 are connected in common through pin A of connector 776 to ground line 768. The bases of transistors 778–792 are connected to resistors 794–808 respectively. The opposite ends of each of these resistors are connected in common to line 810, to X of plug 776 and to F of plug 746. The external circuit applies a suitable biasing voltage to pin F of connector 746. The collectors of transistors 778–792 are connected individually through pins E, H, K, M, P, S, U and W of connector 776 to pins R, P, N, M, L, K, J and H of connector 746 to provide individual output signals for each of the eight possible code hole positions.

By this circuitry and with the brilliance of lamp 104 properly adjusted by the setting of rheostat 762, the transistors 778–792 will be turned on and fully saturated when there is no hole in the record aligned with the associated one of the photovoltaic cells 112–126 respectively and will turn off so that their output to terminals R, P, N, M, L, K, J and H approaches −15 volts when there is a hole in the record aligned with the associated one of the photovoltaic cells 112–126. This is assuming that external circuitry, such as is shown in FIGURE 29, is connected to the reader 50. In other words, if for example, there is a code hole above photovoltaic cell 112 and a code hole above photovoltaic cell 114, and no other code holes in that transverse code hole group, transistors 778 and 780 will be cut off and transistors 782–792 will be conducting at saturation.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a record reader, a record feeding device adapted for actuation in the alternative by manual means and by power means, comprising a record feeding element, a rotatable input shaft drive-connected to said feeding element, a motor having an output shaft, a manually manipulatable solid shaft, and a pair of clutches, one of said clutches being interposed between said motor output shaft and said input shaft and the other of said clutches being interposed between said manually manipulatable solid shaft and said input shaft, said clutches further being simultaneously manipulatable alternatively into mutually exclusive drive-connection with said input shaft.

2. The combination defined in claim 1, wherein said manually manipulatable shaft is mounted for rotation and axial displacement between a pair of limit positions and including means operative in response to axial movement of said manually manipulatable shaft to one of its said limit positions to engage one of said clutches and disengage the other of said clutches and in response to axial movement of said manually manipulatable shaft to the other of its said axial limit positions to disengage said one clutch and engage said other clutch.

3. In a record sensing device into which successive records are manually inserted, means defining a record guide throat having an inlet and an outlet, a record feed mechanism disposed to drivingly engage a record in said throat at one position at least, said position being intermediate the outlet of said throat and said feed mechanism for frictionally supporting and retaining the portion of the record therein whereby a record which has been fed past said feed mechanism will be frictionally retained in said throat until manually removed, means for detecting the presence of a portion of a record in said throat in engagement with said feed mechanism and switch means controlled by said detecting means having a first position while a record is in engagement with said feed mechanism and a second position so long as a record is not in engagement with said feed mechanism.

4. In a record reading device, a record support table, a record hold-down member co-acting with said table to define an elongated throat through which records may be fed for sensing, said throat having an inlet and an outlet, a record feed mechanism disposed intermediate said throat inlet and outlet and effective when operative to feed a record through said throat, a record presence sensing device operative to detect the presence of a record in engagement with said feed mechanism, and switch means controlled by said record presence sensing device having a first position while a record is in engagement with said feed mechanism and a second position so long as a record is not in engagement with said feed mechanism, said hold-down member and said table being operable to frictionally retain the trailing edge of a record in the portion of said throat intermediate its outlet and said feed mechanism whereby a record which has been fed by said feed mechanism through said throat to a position to which its trailing edge has passed said feed mechanism is supported until manually removed from said throat.

5. In a record reader, a record feeding device adapted for actuation in the alternative by manual means and by power means, comprising a record feeding element, a rotatable input shaft drive-connected to said feeding element, a motor having an output shaft, a manually manipulatable solid shaft, and a pair of clutches, one of said clutches being interposed between said motor output shaft and said input shaft and the other of said clutches being interposed between said manually manipulatable solid shaft and said input shaft, and means interconnecting said clutches for simultaneous manipulation alternatively into mutually exclusive drive-connection with said input shaft.

References Cited by the Examiner

UNITED STATES PATENTS

| | | | |
|---|---|---|---|
| 1,098,234 | 5/14 | Dexter | 271—53 |
| 2,904,214 | 9/59 | Miller | 221—43 |
| 2,988,356 | 6/61 | Maier | 271—51 X |
| 3,107,911 | 10/63 | Lundquist et al. | 271—8 |

FOREIGN PATENTS

| | | |
|---|---|---|
| 698,203 | 10/53 | Great Britain. |
| 699,041 | 10/53 | Great Britain. |

ROBERT B. REEVES, *Primary Examiner.*

RAPHAEL M. LUPO, SAMUEL F. COLEMAN, *Examiners.*